United States Patent
Bond et al.

(10) Patent No.: US 10,637,090 B2
(45) Date of Patent: Apr. 28, 2020

(54) SELF-CONTAINED AND SCALABLE MICROBIAL FUEL CELL ARRAY WITH GRID-BASED ANODE AND BOTTLE BRUSH CATHODE POWER SENSORS UNDERWATER

(71) Applicant: The United States of America as represented by the Secretary of the Navy, San Diego, CA (US)

(72) Inventors: Matthew L. Bond, San Diego, CA (US); Yolanda M. Arias-Thode, San Diego, CA (US); Kenneth E. Richter, San Diego, CA (US); David B. Chadwick, San Diego, CA (US); Lewis Hsu, Honolulu, HI (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 47 days.

(21) Appl. No.: 16/143,689

(22) Filed: Sep. 27, 2018

(65) Prior Publication Data
US 2020/0106116 A1    Apr. 2, 2020

(51) Int. Cl.
*H01M 8/16*    (2006.01)
*H01M 4/86*    (2006.01)
*H01M 8/0247*    (2016.01)
*H01M 8/2475*    (2016.01)

(52) U.S. Cl.
CPC .......... *H01M 8/16* (2013.01); *H01M 4/8626* (2013.01); *H01M 8/0247* (2013.01); *H01M 8/2475* (2013.01)

(58) Field of Classification Search
None
See application file for complete search history.

(56) References Cited

U.S. PATENT DOCUMENTS

| | | | |
|---|---|---|---|
| 3,331,705 A | 7/1967 | Davis et al. | |
| 4,972,925 A * | 11/1990 | Saretzky | F16N 7/385 184/7.4 |
| 6,823,814 B2 * | 11/2004 | Bukky | G09F 3/12 116/202 |
| 7,550,224 B1 | 6/2009 | Tender et al. | |
| 8,715,867 B1 | 5/2014 | McNeilly | |
| 9,660,286 B1 * | 5/2017 | McNeilly | H01M 8/16 |
| 2008/0286624 A1 | 11/2008 | Lovley et al. | |
| 2009/0305083 A1 * | 12/2009 | Karamanev | H01M 8/04186 429/2 |
| 2010/0081014 A1 * | 4/2010 | Tyce | H02J 7/36 429/2 |
| 2011/0284368 A1 * | 11/2011 | Goller | C10J 3/485 204/196.02 |
| 2018/0097237 A1 | 4/2018 | Chadwick et al. | |

* cited by examiner

*Primary Examiner* — Scott J. Chmielecki
(74) *Attorney, Agent, or Firm* — Naval Information Warfare Center, Pacific; Kyle Eppele; Young Fei

(57) ABSTRACT

A device for capturing energy, with an anode base, a rigid body, a pressure housing, a cathode array, and a wire. The anode base is connected to the rigid body, the pressure housing is connected to the rigid body, and the cathode array is connected to the rigid body. The first wire is electrically connected to the cathode array. The second wire is electrically connected to the anode base.

9 Claims, 9 Drawing Sheets

SELF-CONTAINED AND SCALABLE MICROBIAL FUEL CELL ARRAY WITH GRID-BASED ANODE AND BOTTLE BRUSH CATHODE POWER SENSORS UNDERWATER

FEDERALLY SPONSORED RESEARCH AND DEVELOPMENT

The Self-Contained and Scalable Microbial Fuel Cell Array with Grid-Based Anode and Bottle Brush Cathode Power Sensors Underwater is assigned to the United States Government and is available for licensing and commercial purposes. Licensing and technical inquiries may be directed to the Office of Research and Technical Applications, Space and Naval Warfare Systems Center Pacific (Code 72120), 53560 Hull Street, San Diego, Calif., 92152, via telephone at (619) 553-2778, or email at ssc_pact_t2@navy.mil. Reference Navy Case 108705 in all communications.

BACKGROUND OF THE INVENTION

Microbial fuel cells (MFCs) capture energy from anaerobic sediments by transferring the electrons released during metabolic processes from the bacteria on the anode to oxygen surrounding the cathode in the water above the anode. MFCs are devices capable of harnessing electrochemical voltage gradients produced by microbes that then can be extracted as electrical energy. MFCs capture energy from anaerobic sediment and donate electrons in the aerobic water column. Typically, MFCs operate at 0.3 volts to 0.45 volts under load, and about 0.6 volts to 0.9 volts in an open circuit. The power output of MFCs is typically dependent on anode size and, dependent on the situation, could be dependent on cathode.

Due to the dependence of output energy on the scale of the MFC device, MFCs designed for providing long-term power to electronics will require appropriate sizing. Previous implementations of MFCs included deployment as a linear array, requiring hundreds of meters of linear cables covering large footprints, and necessitating additional equipment for storage and deployment. Constructing these prior art linear array MFCs was highly labor intensive, requiring long periods of delicate and technical work by specially trained professionals. These prior art linear array MFCs were stored in spools. Preparing these spools for deployment required time consuming and delicate work. Deploying these spools also required specialized equipment, such as a boat or ship with a powerful enough engine to pull a sled, on which the spool sits and from which the linear array MFC was deployed. Divers were required to check the entire sled path in order to ensure the proper burial of the linear array MFC. When the system was retrieved, the linear array MFC could be reused, but cleaning and respooling the hundreds of meters of the array was time consuming.

SUMMARY OF THE INVENTION

The present invention is a device for capturing energy, with an anode base, a rigid body, a pressure housing, a cathode array, and a wire. The anode base is connected to the rigid body, the pressure housing is connected to the rigid body, and the cathode array is connected to the rigid body. The first wire is electrically connected to the cathode array. The second wire is electrically connected to the anode base.

In one embodiment, the anode base has a plurality of anode plates, each orthogonally connected to at least one other anode plate by an anode plate weld. The rigid body has a vertical member orthogonally connected to a horizontal member, and a horizontal cross member orthogonally connected to the vertical member. The pressure housing has a cylindrical member, a first end cap and second end cap abutting the cylindrical member at its first end and second end. The cylindrical member has first end threads formed thereon at the first end, and second end threads formed thereon at the second end. The first end cap further comprises a window portion. The cathode array comprises a plurality of brush members, a first bar member electrically connected to the brush member, and a second bar member electrically connected to the brush member. Each brush member is parallel to every other brush member. The first bar member is orthogonal to the brush member. The second bar member is orthogonal to the brush member. The first bar member is parallel with the second bar member.

In yet another embodiment, the anode plate is carbon cloth covered titanium. The vertical member, horizontal member, and horizontal cross members are polyvinyl chloride. The first bar member, the second bar member, the first wire, and the second wire are titanium.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

This invention presents a scalable, self-contained microbial fuel cell (MFC) device for capturing energy 100 based on a grid-structured anode base 200 and a bottle-brush cathode based cathode array 500. The invention can also utilize carbon cloth if that better suited the deployment conditions. The device for capturing energy 100 is portable and deployable by a limited number of personnel with minimal tools and training, and is able to harvest energy from the sediment of a body of water (including fresh, brackish, or marine water). Depending on the scale of the build, the device for capturing energy 100 is capable of harvesting power on the order of milliwatts to watts. The device for capturing energy 100 is recoverable and reusable by individuals of all levels of skill and training, and requires very little servicing between deployments. The device for capturing energy 100 can integrate a variety of electronics which can be used to harvest energy in order to determine power potential, or harvest power directly for use by underwater sensors, amongst other uses. The device for capturing energy 100 is in a novel form factor designed to be put into place by scientists or sailors in a marine or riverine environment (or any other water environment), requiring only physical digging for deployment. Digging may be accomplished by the use of tools ranging from shovels to earth moving excavators. Force pushing the device 100 into the sediment can also work in some environments.

Figure 1:
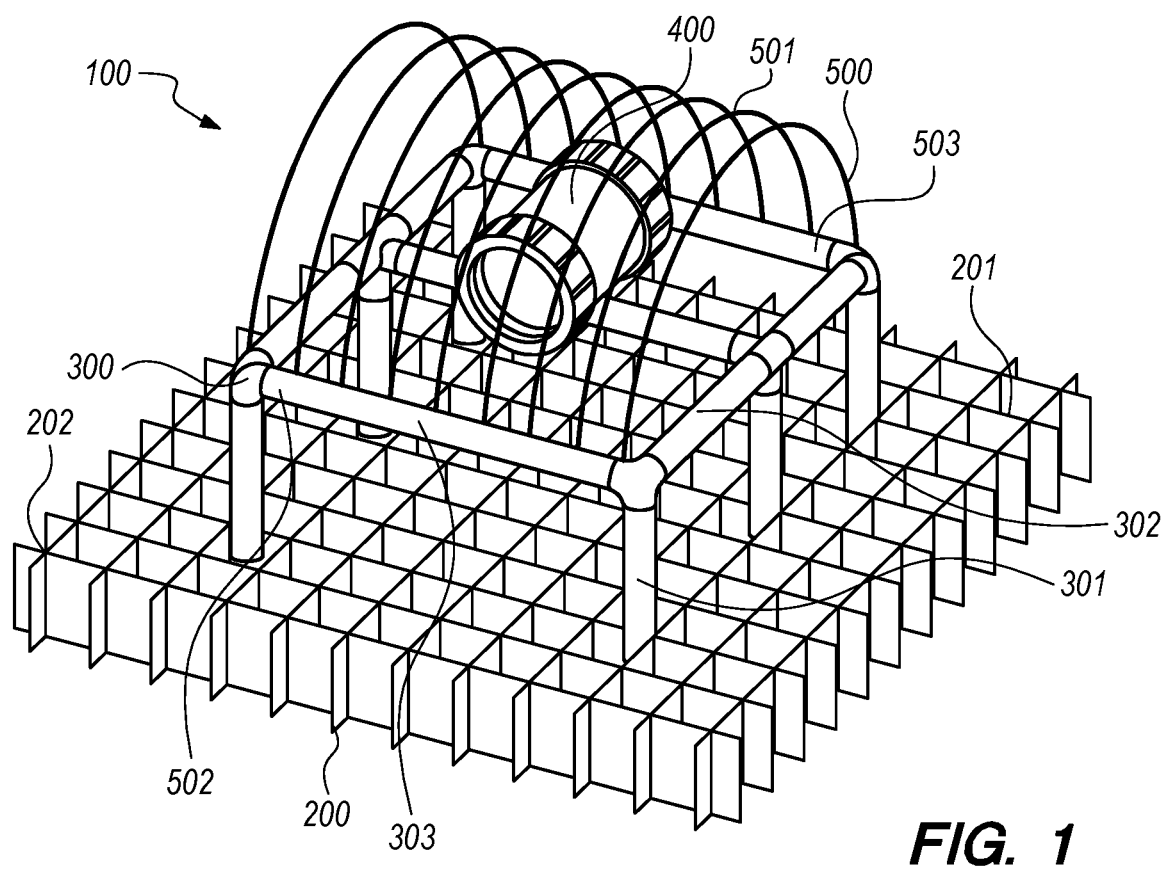
FIG. 1 is a front perspective view of one embodiment of the present invention.

FIG. 1 depicts a front perspective view of the device for capturing energy 100. The device for capturing energy 100 comprises an anode base 200. The anode base 200 is constructed from a series of anode plates 201, which are welded with an anode plate weld 202 at the top and bottom of where the edges meet. The anode plates 201 are arranged in a manner such that each anode plate 201 is orthogonal with at least one other anode plate 201. The spacing and total number of plates are adjustable based on the desired footprint of the device for capturing energy 100 and the power generation requirements. In the present embodiment, 35 mil titanium was chosen for the anode plates 201 based on the material's corrosion resistance properties and high electrical conductivity. The anode plates 201 are polished and covered with carbon fiber cloth. The carbon fiber cloth can be attached to the anode plates 201 using spray adhesive. The carbon fiber cloth direction in relation to the anode plate 201 orientation is alternated. After constructing the leading edge, the edge will represent the bottom edge of the array, where the titanium is always covered by carbon fiber cloth. This minimizes the risk of sediment entering any space between the carbon fiber cloth and the titanium anode plate 201 during deployment. Triangular pieces of carbon fiber cloth are also removed from the titanium anode plates 201 at each junction between the plates in order to provide a clean surface for the anode plate welds 202. Tack welding may be used for the anode plate welds 202. Once welded, the anode base 200 will form a mechanically solid structure which will not disassemble when pushed through sediment. This ensures electrical and mechanical connections can be maintained.

FIG. 1 also depicts a rigid body 300 attached to the anode base 200. The rigid body 300 comprises a plurality of vertical members 301 which attach to the anode base 200 orthogonally. These vertical members 301 may be bolted to the anode plates 201, or attached in some other manner. Horizontal members 302 are orthogonally attached to the vertical members 301. Horizontal cross members 303 are orthogonally connected to both the vertical members 301 and the horizontal members 302. The vertical members 301, horizontal members 302, and horizontal cross members 303 may be polyvinyl chloride pipes. The number of connection points between the vertical members 301 and the anode plates 201 will depend on the desired mechanical strength of the overall device for capturing energy 100. The larger the scale of the device for capturing energy 100, the more connection points will be required to satisfy the required mechanical strength for transportation as well as installation and extraction.

Figure 5:
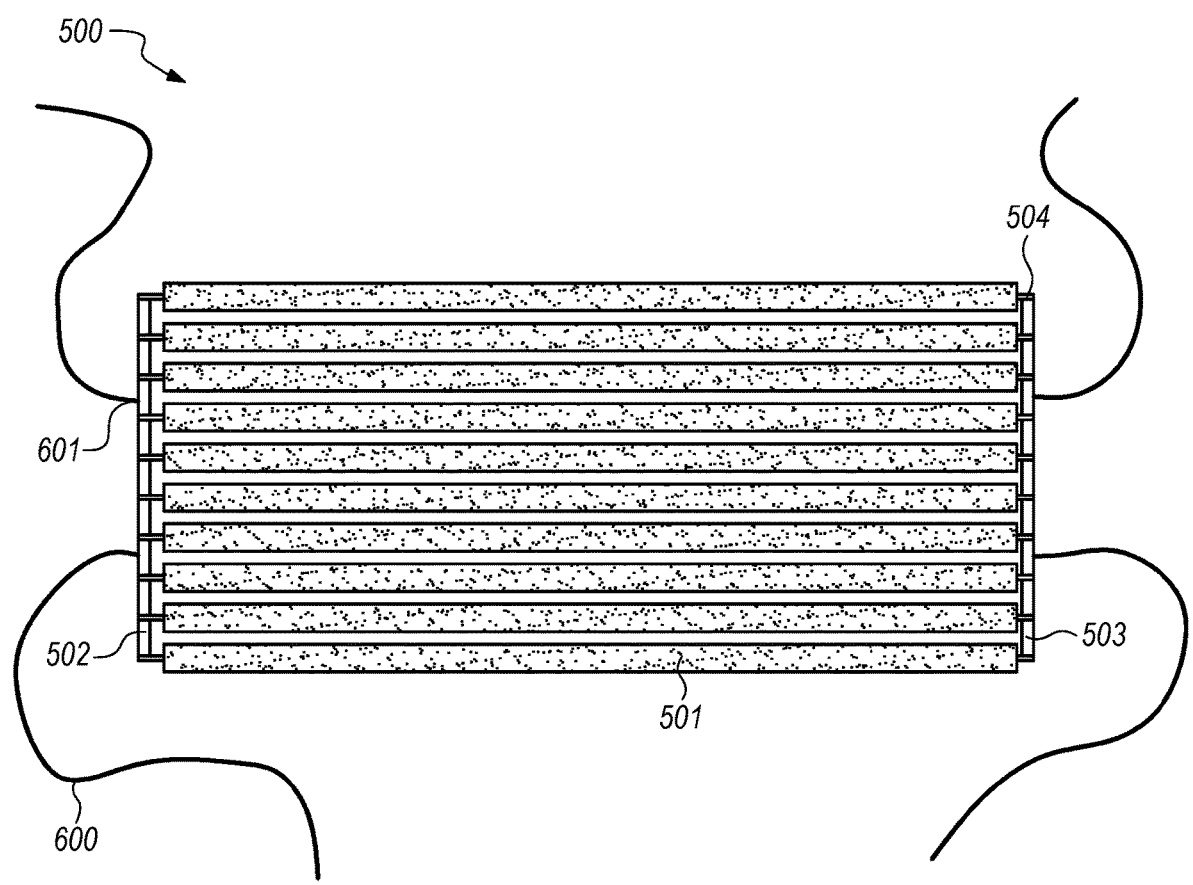
FIG. 5 is a top view of a cathode array according to one embodiment of the present invention.

FIG. 1 also depicts a cathode array 500 attached to the rigid body 300. The cathode array 500 comprises a plurality of brush members 501 which serve as the cathodes. The number of brush members 501 will depend on the desired scale of the device for capturing energy 100. FIG. 5 depicts a top view of the present embodiment where the brush members 501 are electrically connected to the first bar member 502 and the second bar member 503 using cathode array welds 504. The first bar member 502 and the second bar member 503 are electrically conductive titanium bars. A first wire 600 is electrically connected to the first bar member 502 with a wire weld 601. The first wire 600 is a titanium wire.

Figure 7:
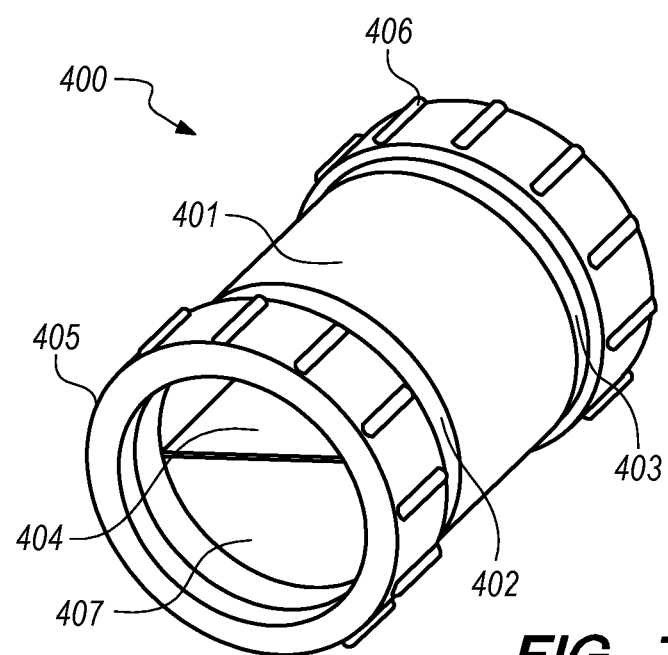
FIG. 7 is a front perspective view of a pressure housing according to one embodiment of the present invention.

The device for capturing energy 100 further comprises a pressure housing 400 for components such as circuit boards, batteries, supercapacitors, modems, and other desired components depending on the mission. FIG. 7 depicts the pressure housing 400 in greater detail. The pressure housing 400 comprises a cylindrical member 401 with a first end and a second end. The cylindrical member has first end threads 402 at the first end, and second end threads 403 at the second ends. The first end cap 405 attaches to the first end by screwing onto the first end threads 402, and the second end cap 406 attaches to the second end by screwing onto the second end threads 403. The cylindrical housing 401 has a shelf member 404 inside of it, which can serve as structural support for internal components or as a divider. The shelf member 404 may not be required if the internal components do not require it. The first end cap 405 has a window portion 407 so the user can visually inspect internal components without removing the first end cap 405. The window portion 407 aids in visualization of the interior of the cylindrical housing 401, but is not required. The first wire 600 is electrically connected to the first bar member 502, and is fed into the cylindrical housing 401.

Figure 6:
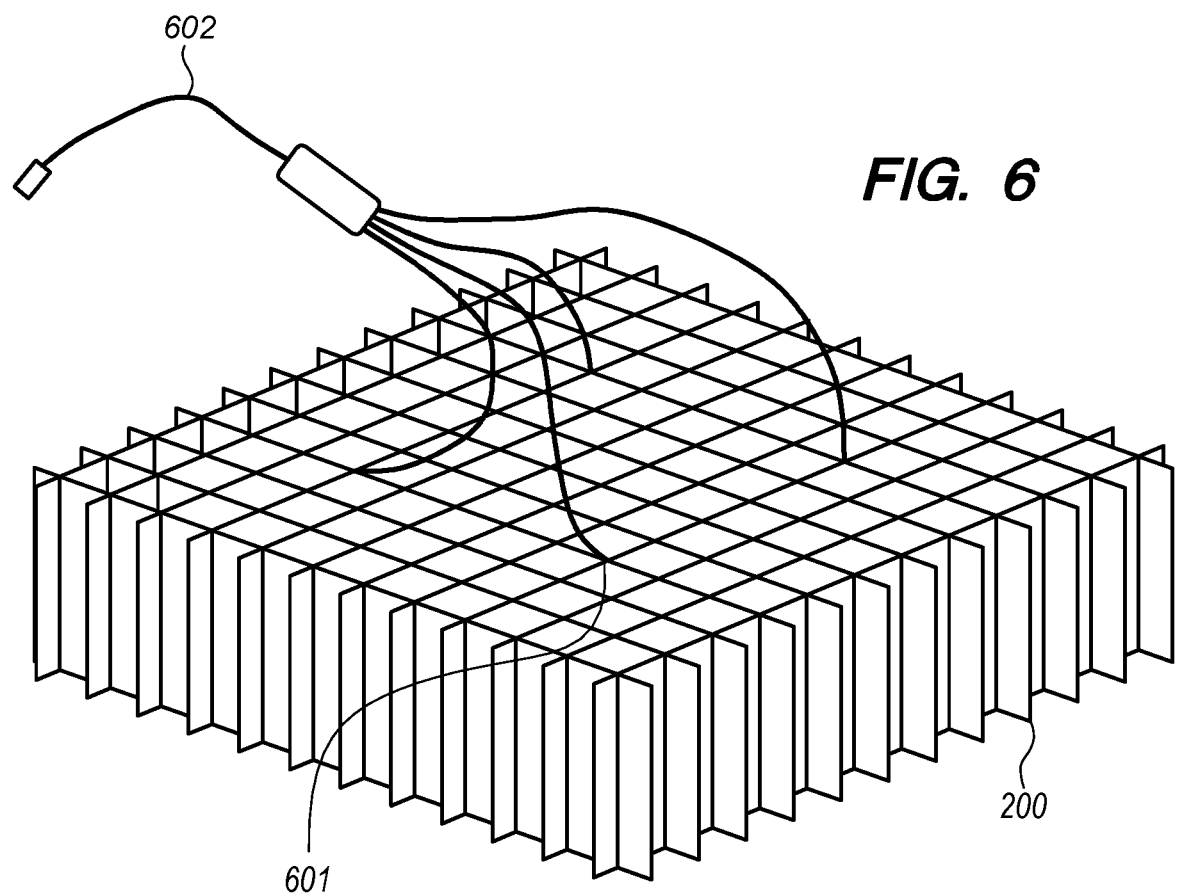
FIG. 6 is a front perspective view of an anode base and a wire according to one embodiment of the present invention.

FIG. 6 depicts a second wire 602 which attaches using wire welds 601 to the anode base 200 at various points. The second wire 602 is also a titanium wire. The second wire is fed into the cylindrical housing 401.

Figure 2:
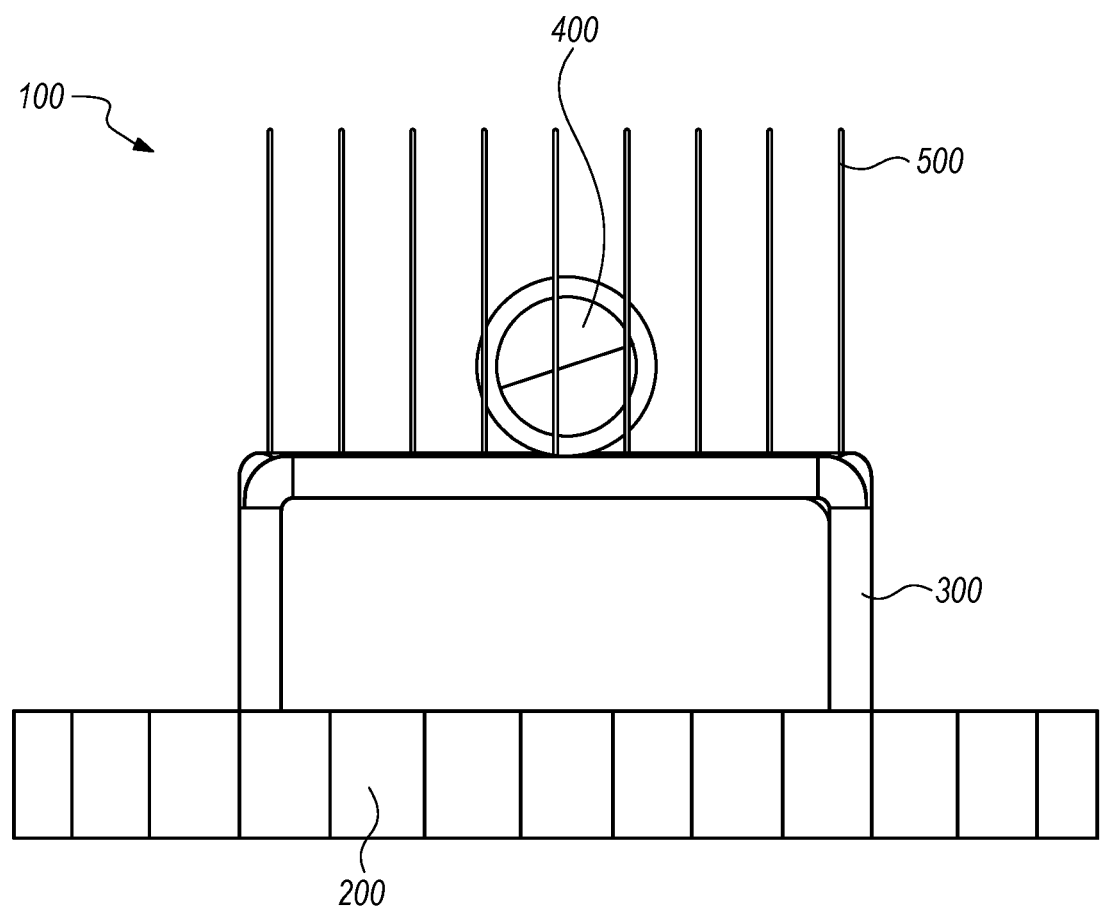
FIG. 2. is a frontal elevation view of one embodiment of the present invention.

FIG. 2 depicts the relationship between the anode base 200, the rigid body 300, the pressure housing 400, and the cathode array of the device for capturing energy from a frontal elevation view.

Figure 3:
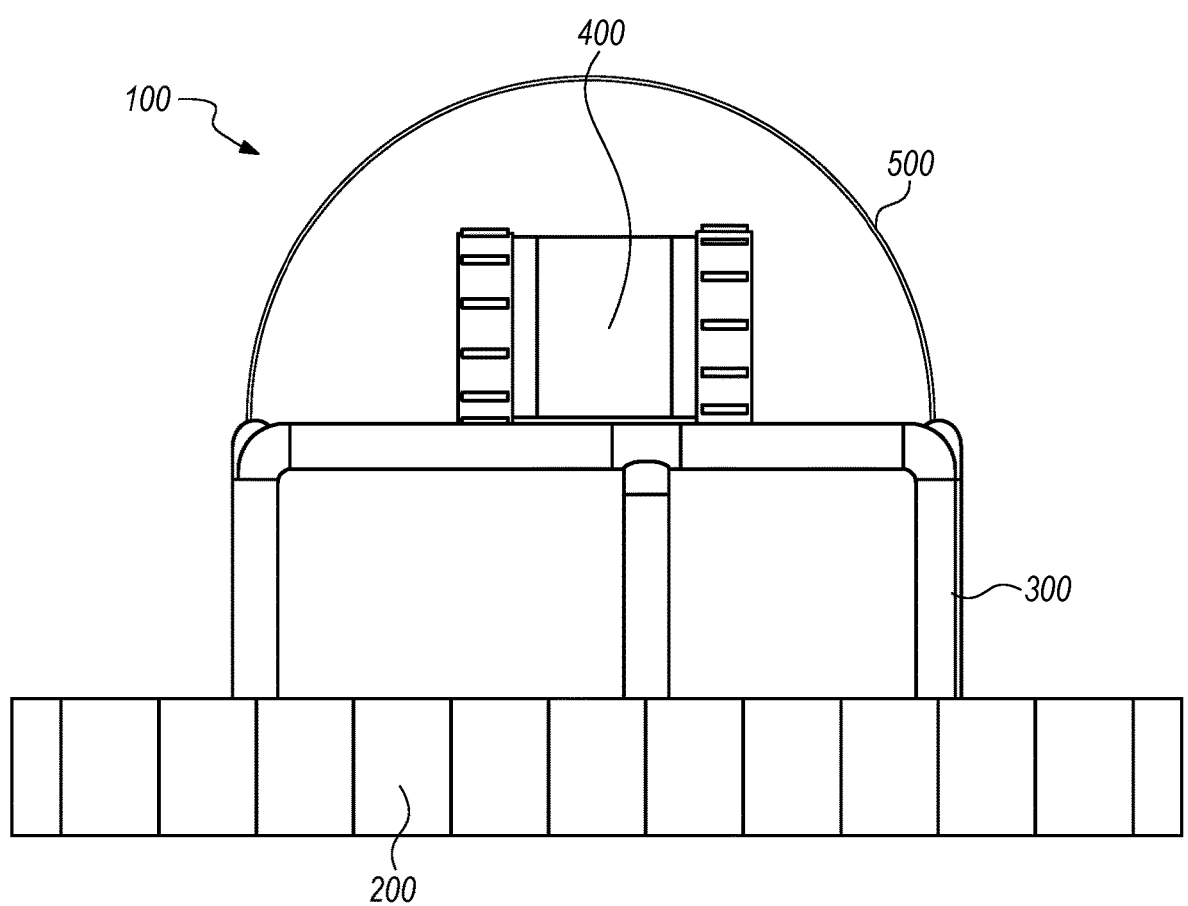
FIG. 3 is a right elevation view of one embodiment of the present invention.

FIG. 3 depicts the relationship between the anode base 200, the rigid body 300, the pressure housing 400, and the cathode array of the device for capturing energy from a right elevation view.

Figure 4:
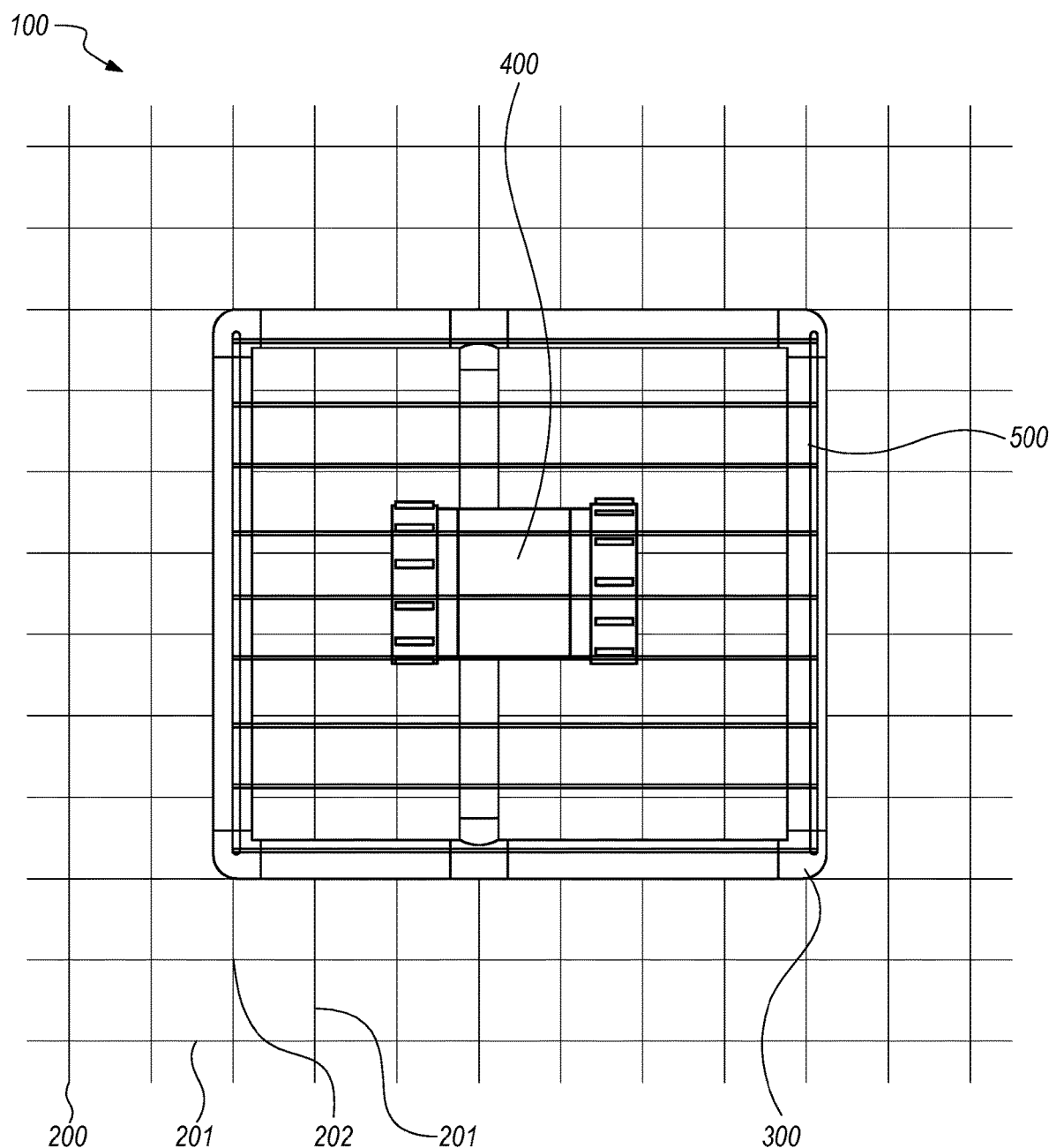
FIG. 4 is a top view of one embodiment of the present invention.

FIG. 4 depicts the relationship between the anode base 200, the rigid body 300, the pressure housing 400, and the cathode array of the device for capturing energy from a top view. FIG. 4 also depicts in detail the orthogonal relationship between the anode plates 201, as well as the anode plate welds 202 where the anode plates 201 are joined.

The device for capturing energy 100 may be used to power a pH meter in a marine or riverine environment and send out a signal to a communications device. Depending on power availability, the external communication device can be powered by the device for capturing energy 100. In other embodiments, data loggers inside the pressure housing 400 could store the data internally, with the data retrieved at the end of a deployment or as needed. Sensors other than pH meters may be used—any low power sensor which could be integrated with the electronics inside the pressure housing 400 can be used.

Figure 8:
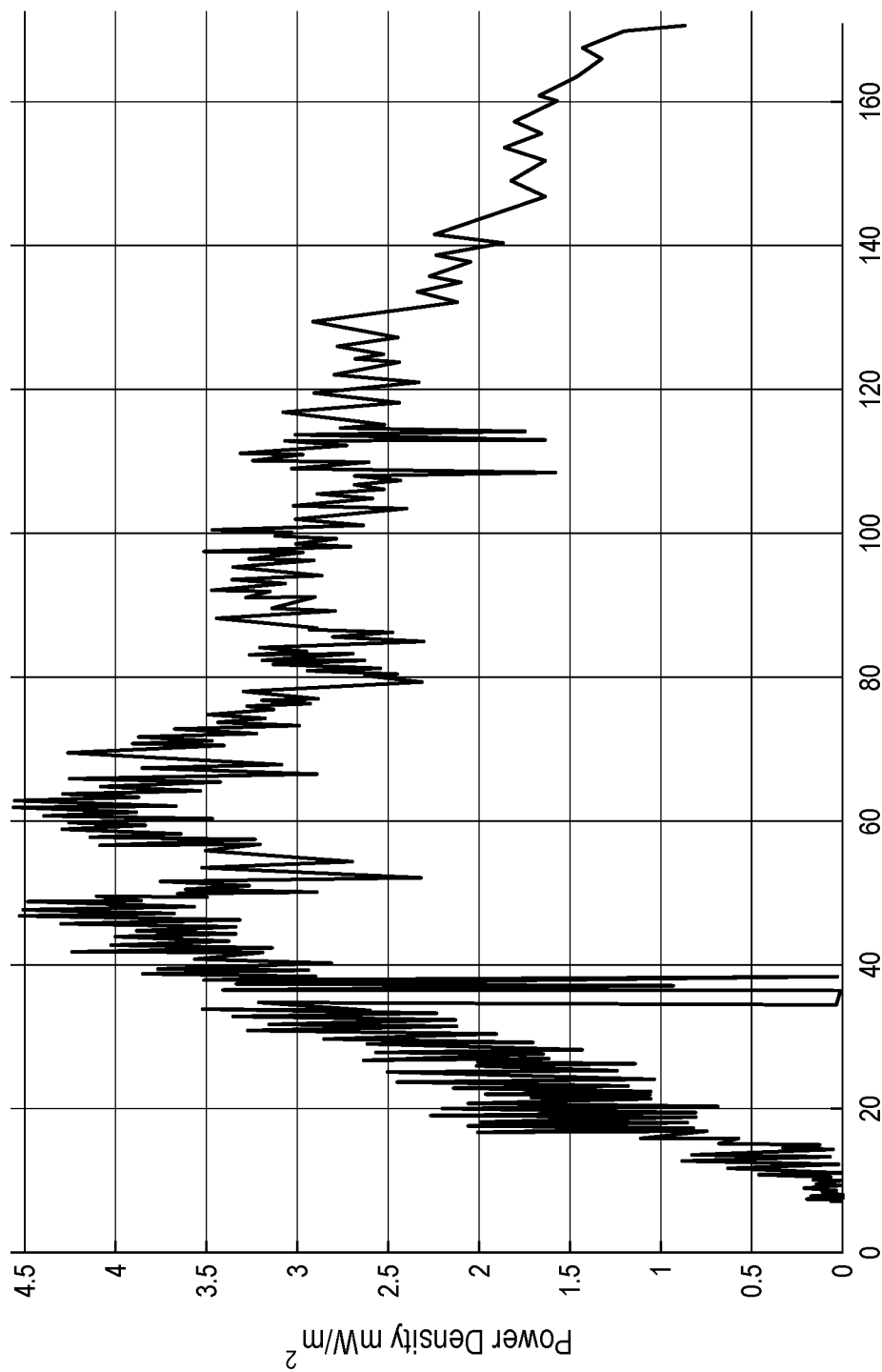
FIG. 8 is a chart depicting the power output over time according to one embodiment of the present invention.
Figure 9:
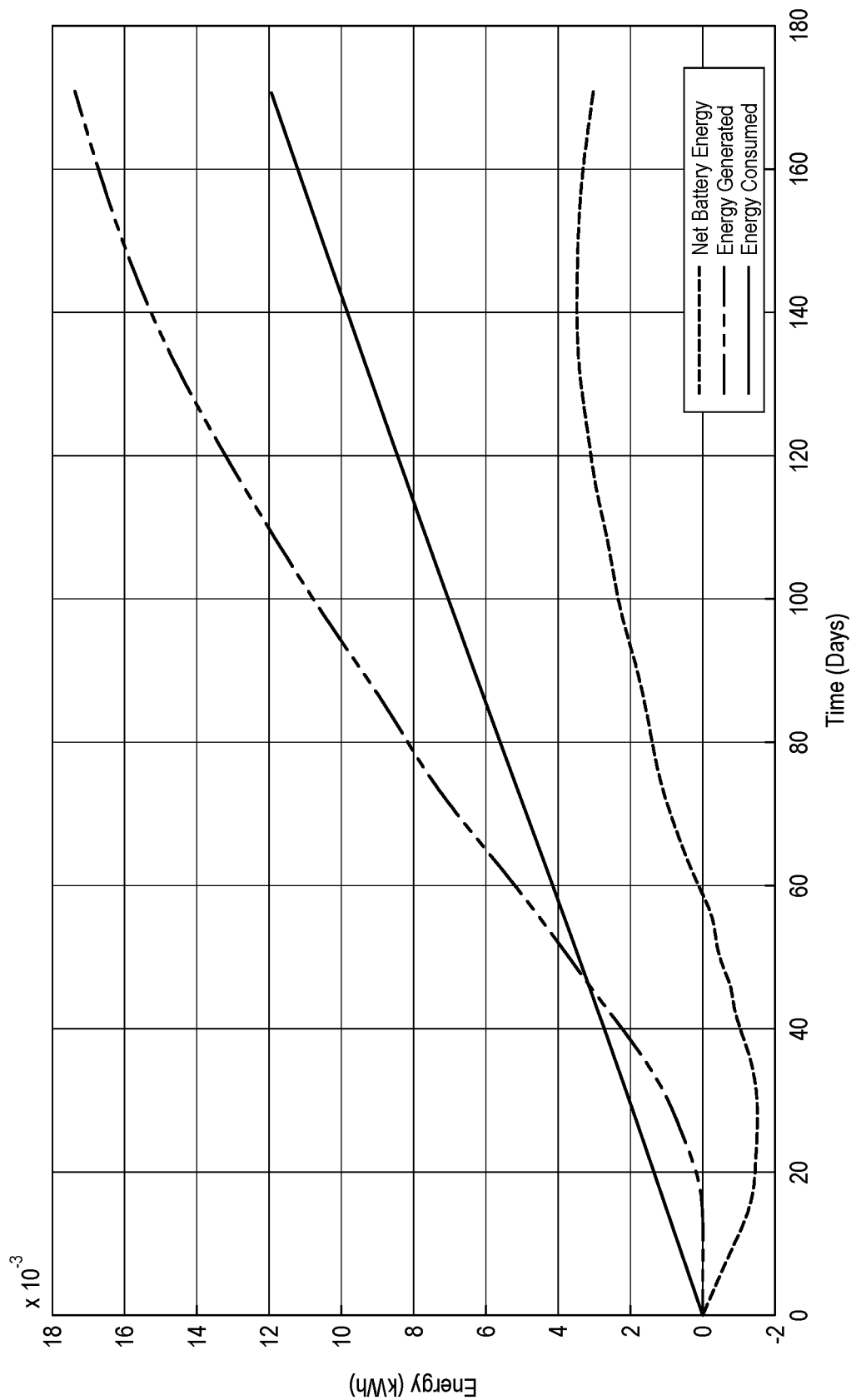
FIG. 9 is a chart depicting the energy over time according to one embodiment of the present invention.

FIG. 8 depicts the power generated by an embodiment of the present invention over the course of 180 days in an embodiment of the invention powering a pH meter and modem. FIG. 9 shows the net energy usage of this embodiment. FIG. 9 depicts a net energy generation over the 180-day period.

From the above description of the present invention, it is manifest that various techniques may be used for implementing its concepts without departing from the scope of the claims. The described embodiments are to be considered in all respects as illustrative and not restrictive. The device disclosed herein may be practiced in the absence of any element that is not specifically claimed and/or disclosed herein. It should be understood that the present invention is not limited to the particular embodiments described herein, but is capable of being practiced in many embodiments without departure from the scope of the claims.

What is claimed is:

1. A device for capturing energy comprising:
an anode base connected to a rigid body;
a pressure housing connected to the rigid body;
a cathode array connected to the rigid body;
a first wire electrically connected to the cathode array; and
a second wire electrically connected to the anode base,
wherein the anode base comprises a plurality of anode plates, and
wherein each anode plate is orthogonally connected to at least one other anode plate by an anode plate weld.

2. A device for capturing energy comprising:
an anode base comprising a plurality of anode plates, each orthogonally connected to at least one other anode plate by an anode plate weld;
a rigid body comprising a vertical member orthogonally connected to a horizontal member, a horizontal cross member orthogonally connected to the vertical member;
a pressure housing comprising a cylindrical member comprising a first end and a second end, a shelf member connected to the cylindrical member, a first end cap abutting the first end, a second end cap abutting the second end, wherein the cylindrical member comprises a first end threads formed thereon at the first end, wherein the cylindrical member comprises a second end threads formed thereon at the second end, wherein the first end cap further comprises a window portion;
a cathode array comprising a plurality of brush members, a first bar member electrically connected to the brush member, a second bar member electrically connected to a brush member, wherein each brush member is parallel to every brush member, wherein the first bar member is orthogonal to the brush member, wherein the second bar member is orthogonal to the brush member, wherein the first bar member is parallel to the second bar member; and
a first wire electrically connected to the first bar member, and a second wire electrically connected to the anode plate.

3. The device of claim 2, wherein the anode plate is carbon cloth covered titanium.

4. The device of claim 2, wherein the vertical member is polyvinyl chloride.

5. The device of claim 2, wherein the horizontal member is polyvinyl chloride.

6. The device of claim 2, wherein the horizontal cross member is polyvinyl chloride.

7. The device of claim 2, wherein the first bar member is titanium, wherein the second bar member is titanium.

8. The device of claim 2, wherein the first wire is titanium, wherein the second wire is titanium.

9. A device for capturing energy comprising:
an anode base comprising a plurality of anode plates, each orthogonally connected to at least one other anode plate by an anode plate weld;
a rigid body comprising a vertical member orthogonally connected to a horizontal member, a horizontal cross member orthogonally connected to the vertical member;
a pressure housing comprising a cylindrical member comprising a first end and a second end, a shelf member connected to the cylindrical member, a first end cap abutting the first end, a second end cap abutting the second end, wherein the cylindrical member comprises a first end threads formed thereon at the first end, wherein the cylindrical member comprises a second end threads formed thereon at the second end, wherein the first end cap further comprises a window portion;
a cathode array comprising a plurality of brush members, a first bar member electrically connected to the brush member, a second bar member electrically connected to a brush member, wherein each brush member is parallel to every brush member, wherein the first bar member is orthogonal to the brush member, wherein the second bar member is orthogonal to the brush member, wherein the first bar member is parallel to the second bar member;
a first wire electrically connected to the first bar member, and a second wire electrically connected to the anode plate; and
wherein the anode plate is carbon cloth covered titanium, wherein the vertical member is polyvinyl chloride, wherein the horizontal member is polyvinyl chloride, wherein the horizontal cross member is polyvinyl chloride, wherein the first bar member is titanium, wherein the second bar member is titanium, wherein the first wire is titanium, and wherein the second wire is titanium.

* * * * *